Sept. 2, 1941.  V. GREY  2,254,281
TAPPING FIXTURE
Filed Sept. 11, 1939
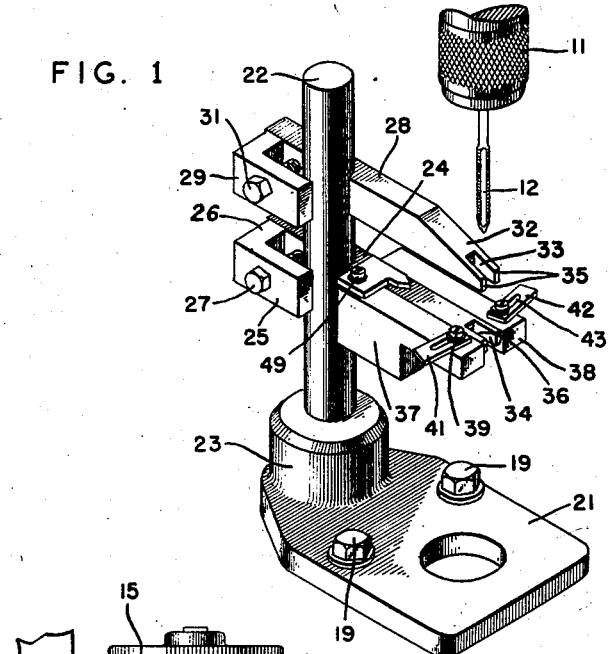
INVENTOR.
VICTOR GREY
BY
*H. B. Whitfield*
ATTORNEY.

Patented Sept. 2, 1941

2,254,281

UNITED STATES PATENT OFFICE 2,254,281

TAPPING FIXTURE

Victor Grey, Chicago, Ill., assignor to Teletype Corporation, Chicago, Ill., a corporation of Delaware Application September 11, 1939, Serial No. 294,265

9 Claims. (Cl. 10—107)

This invention relates to appliances for metal working machinery and more particularly to holding or supporting fixtures to be used in connection with tapping, drilling, and other rotary spindle machines.

The advantages of a work holding and aligning fixture for use in connection with machining operations, especially in the case of small piece parts are well recognized, but in job shops catering to a large variety of detail operations, the stocking and maintenance of individual holding and aligning fixtures for each type or specie of work places an appreciable expense not only on the toolroom because of the initial manufacturing costs and subsequent maintenance, but also upon other plant departments because of the necessity of cataloging, listing, and inventory incident to stockroom operations. By the incorporation of certain fixture designing principles, hereinafter disclosed, supporting and aligning fixtures may be made more generally universal or semi-universal toward the end of permitting a single fixture setup to accommodate a wide range of work by affording certain latitudes of adjustment and regulation. Thus, small articles of manufacture, varying from each other by limited degrees in contour and proportion, may be accommodated in a single fixture which admits of corresponding latitudes of adjustment.

Accordingly, a main object of the present invention is to provide a supporting and aligning fixture for holding securely small piece parts during rotary spindle operations.

In one of its fundamental embodiments, this improvement may comprise a main supporting post having integrally associated therewith means for anchoring said post to the bed plate of a tapping or drilling machine. To the supporting post are then applied main clamping members which may be adjusted to define upper and lower confinement guides to a piece of work, said members being adjustably clamped to the supporting post and themselves affording an anchorage means to subsidiary alignment and confining elements. Complementing the function of said main supporting fixtures, said subsidiary elements may provide lateral confining and limiting support as well as depth regulation, thereby directing the proper insertion and removal of small piece parts during and before the processing operations as well as affording stability to prevent dislodging by reason of the vibrations and movements of the rotary spindle.

For a more comprehensive understanding of the present invention, reference may be had to the detailed specification following hereinafter and to the accompanying drawing in which like reference characters designate corresponding parts throughout and, in which Fig. 1 is a detailed perspective view of a supporting and aligning fixture especially adapted for use in connection with a tapping machine;

Fig. 2 is a side elevation of a tapping machine showing an improved semi-universal tapping fixture applied thereto;

Fig. 3 is a sectional view taken approximately on line 3—3 of Fig. 2;

Fig. 4 is a fragmentary perspective view of a peculiarly shaped piece part for which the tapping fixture, shown in Figs. 1 to 3, is, in the instant case, adjusted; and Fig. 5 is a detailed perspective view of a semi-universal tapping fixture, such as that illustrated in Figs. 1 to 3, having applied thereto a modified form of sub-fixture assembly.

In describing the invention now more particularly, attention is directed to the reference character 11 which denotes a tapping spindle chuck of any conventional type having secured in its jaws the tap 12. The chuck shaft 13 extends into a housing 14 which contains mechanism for reversing the direction of rotation through a gear train and clutch the instant that the direction of spindle advance is reversed. This type of apparatus is well known in the art so that it may suffice to say that the entire assembly is driven from a vertical spindle motor indicated 15.

A bracket 16 for supporting the motor and its depending apparatus is itself carried in a trackway indicated 17, suitable controls being provided for raising and lowering the entire assembly by means of a movement introduced through a system of control levers upon the bracket 16. Alternatively, and within the contemplation of the present disclosure, the motor assembly may be held stationary and the tapping bed or plate 18, Fig. 2, moved up and down to prevent and withdraw the work towards and away from the tap 12.

Bed plate 18 is a horizontal table preferably milled on its top surface to obtain a true plane and, at various points to accommodate the individual requirements of the class of work which is proposed to be done, tapped holes are provided in which are received anchor bolts 19, see also Fig. 1, for securing the post flange 21 which carries the vertical mounting post 22. To strengthen the assembly, flange 21 is provided with a boss 23 apertured to receive the post 22 in true perpendicular alignment to the milled undersurface of flange 21.

A lowermost clamping bar 24 is grooved transversely with a shallow cylindrical concavity to conform with the curvature of post 22 and thereat is clamped to said post by the action of the clamping lug 25 whose heel 26 constitutes a fulcrum as it is drawn toward the bar 24 through the action of the clamping bolt 27. A stripper bar 28, located just above the lower clamping bar 24, is outfitted similarly, it too having a clamping lug indicated 29 and an associated clamping bolt 31. The stripper bar or guide 28 tapers downwardly as at 32 while bar 24 does so in a symmetrically opposite manner, both bars being slotted as at 33 and 34, so as to admit the tap 12 to be received freely between the adjacent wall sections 35 and 36.

Saddled on both sides of the lower block 24 are a pair of side blocks 37 and 38 of similar contour and each having a tapped hole in which is received one of the adjustment screws 39. The latter serve to bind securely associated ones of the guide blocks 41 or 42 in a predetermined position to correspond with the particular requirements of the work. As may be seen from Figs. 1 and 3, the side supporting guide blocks 41 and 42 each are provided with one or more elongated holes 43, depending upon the proportions of the guide blocks and the amount of rigidity which is required to be imposed upon the work.

Under conditions such as those required by a piece part or a piece part projection of no greater intricacy than that illustrated in Fig. 4, ample support is obtained from guide blocks, such as those indicated in 41 and 42 which are secured by means of a single adjustment screw 39. The side-to-side adjustment is determined by the tapered sides 44 and 45 of the piece part, but in order to locate the hole 46 accurately with respect to the stripper notch 34 of the lower clamping bar 24, a limiting member or stop 47 having an abutment lug 48 is predeterminately adjusted as by shoulder screw 49 which passes through the elongated slot in said member 47. When the piece part is inserted between the side guide plates 41 and 42 and between the top and bottom clamping members 24 and 28, it remains then only to limit its position by the depth or insertion limiting plate 47, upon the attainment of which by the piece part its sides are confined closely between the guide blocks or plates 41 and 42. The tapping operation may then be undertaken by lowering the tap chuck 11 in a conventional manner until the thread is tapped in hole 46, after which the tap is extracted by reversal in the movement of chuck 11. It will be observed that because of the close confinement of the piece parts between the aforedescribed several limiting elements, the piece parts may be prevented from rotating or otherwise yielding to the torsional influence of the rotating tap 12.

It is to be noted also that each of the members which clamps upon the mounting post 22 possesses considerable versatility in relative placement upon the post 22; for example, see Fig. 5 where a subassembly table 51 having a circular tapping or drilling die 52 is held between a pair of clamp bars 53 and may utilize a stripper bar 28 in the manner shown. A slight angular displacement of the latter is made here as compared with the alignment illustrated in Fig. 1. For variations in the thickness of the piece part, it will be understood that the two clamping members 24 and 28 may be accordingly spaced apart.

While the present invention has been explained and described with reference to and in contemplation of a specific embodiment, it is to be understood nevertheless that numerous variations may be made from the specific showing without departing from the spirit of the present invention. Accordingly, it is intended not to be limited by the specific language of the aforegoing description nor by the structural details shown in the accompanying drawing, except as indicated in the hereunto appended claims.

What is claimed is:

1. In combination with tapping or drilling machines having a horizontal bed plate and a vertical rotary spindle, a universal fixture appliance comprising a vertical cylindrical post, means for securing said post to said bed plate in perpendicular alignment, a pair of main supporting members, means for clamping said members to said post at variable height and in predetermined space relationship each from the other, a pair of side confining guides, means for adjustably securing said guides to one of said members, and a forward stop including means for adjustably securing said stop, said side guides, supporting members, and stop comprising limiting elements effective in a plurality of lateral directions for embracing and restricting piece parts therebetween.

2. In a holding fixture for rotary spindle machines, a vertical supporting post secured to the machine, a pair of horizontal supporting arms clamped to said post and adjustably positionable both vertically and rotationally thereon, said arms having apertures therein for admitting and directing the progress of a tool carried by the machine, and piece part confining accessories comprising side guide elements and a forward limiting stop carried by one of said arms.

3. A holding fixture comprising a supporting base, an upright integrally associated therewith of cylindrical configuration, a plurality of arms clamped to said upright consisting of horizontally extending members shaped of bar stock having arcuate recesses therein to conform with the curvature of said cylindrical upright, cooperating lugs for clamping said arms to said upright to restrict vertical movement of piece parts therebetween, and confining elements carried by one of said arms comprising separable members each provided with an elongated slot to which threaded securement means is admitted for clamping said members against said arm to define sidewardly and endwardly limiting means for embracing and restricting piece parts therebetween.

4. A universal holding fixture for rigidly supporting parts that are subjected to rotary spindle machining operations comprising, a supporting base, a vertical anchorage post integral with said base and extending parallelly to but in offset relationship from a rotary machining spindle, means associated with said base for securing it rigidly with respect to a rotary spindle, a lower fixture block including a clamping device for securing said block to said post at variable elevation, an upper fixture block including clamping means for securing said block to said post at variable elevation and in spaced relation to said lower fixture block for affording therebetween a dimension of clearance predeterminedly corresponding to parts for rotary machining, a set of laterally limiting guide elements, and means carried by said lower fixture block for adjustably supporting said lateral limiting guide elements.

5. In combination with a rotary spindle machining apparatus including a stationary base and a rotatable shaft longitudinally movable toward and away from said base, a piece part holding fixture comprising a clamping plate to be secured to said base having integral therewith a stud post extending parallel to the spindle of said apparatus, a first element, means for clamping said first element to said post at variable positions lengthwise thereof, apparatus adjustably associated with said first element for confining piece parts laterally thereof, and a second element, means for clamping said second element to said post in spaced relation to said first element and having a recess to admit a machining tool carried by said spindle therethrough.

6. An accessory fixture for rotary spindle machines comprising a base plate with means for clamping said plate parallelly to a stationary base element of a rotary spindle machine, a stud shaft anchored in said base plate and extending perpendicularly therefrom to a limited height, a lower clamping arm including accessories for securement thereof to said stud shaft at variable positions longitudinally of said shaft, an upper arm including clamping accessories for securing said upper arm on said stud shaft in spaced relation to said lower arm, and a plurality of lateral dimension confining members adjustably securable to said lower arm.

7. In a rotary spindle machine, a horizontal base plate, a vertical tool supporting column, a rotary spindle tool carrier carried by said column for longitudinal movement toward and away from said base plate, and a removable piece part holding fixture comprising a stud post, means for removably supporting said stud post in said base in parallel relationship to said spindle and column, and a plurality of clamping arms adjustably secured to said stud post in superposed relation for affording limited intervening space to confine piece parts against said longitudinal movement of said spindle.

8. The combination with a rotary spindle machine including a supporting column, a rotary tool carrying spindle movable parallelly with respect to said column, and a base element extending substantially perpendicular from and securable to said column, a removable piece part insertion type fixture comprising a stud post, means for removably securing said stud post perpendicularly to said base element, a pair of supporting arms adjustably securable to said post at variable elevation from said base element and in predetermined spaced relation one from the other, said arms constituting confinement means for piece parts in a direction parallel to the movement of said spindle, and a plurality of adjustably securable confining lugs carried by one of said arms constituting limiting elements in a direction transverse to the movement of said spindle.

9. In combination with a vertical spindle machining apparatus comprising a vertical supporting column, a base substantially perpendicular thereto affording a work backing platform, and a power driven spindle parallel to said column and movable towards and away from said base, a removable supporting fixture into which work may be inserted horizontally for support against lateral and vertical displacement comprising a stud post, means for removably supporting said post perpendicularly upon said base, a horizontally extending lower block carried by said post affording adjustable bottom and lateral support and a horizontally extending upper block also carried by said post affording top support and acting as a stripping element in co-operation with said machining spindle.

VICTOR GREY.